United States Patent
Rajakarunanayake

(10) Patent No.: US 9,495,319 B2
(45) Date of Patent: Nov. 15, 2016

(54) DOCKING TO SUPPORT SECURE ASSOCIATIONS AND FLEXIBLE MANUFACTURING

(71) Applicant: Broadcom Corporation, Irvine, CA (US)

(72) Inventor: Yasantha Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 441 days.

(21) Appl. No.: 14/166,096

(22) Filed: Jan. 28, 2014

(65) Prior Publication Data

US 2015/0192917 A1 Jul. 9, 2015

Related U.S. Application Data

(60) Provisional application No. 61/923,303, filed on Jan. 3, 2014, provisional application No. 61/885,303, filed on Oct. 1, 2013.

(51) Int. Cl.
*G05B 19/18* (2006.01)
*G06F 13/40* (2006.01)
*G05B 19/042* (2006.01)

(52) U.S. Cl.
CPC ......... *G06F 13/4068* (2013.01); *G05B 19/042* (2013.01); *G05B 2219/23406* (2013.01)

(58) Field of Classification Search
None
See application file for complete search history.

(56) References Cited

U.S. PATENT DOCUMENTS

| | | | | |
|---|---|---|---|---|
| 6,279,059 B1* | 8/2001 | Ludtke | ............. | F16M 11/043 709/229 |
| 7,697,963 B1 | 4/2010 | Pomery | | |
| 8,145,821 B2* | 3/2012 | Mead | ............. | G06F 1/1632 361/679.41 |
| 2002/0068983 A1* | 6/2002 | Sexton | ............. | G05B 19/05 700/2 |
| 2002/0119800 A1* | 8/2002 | Jaggers | ............. | H04M 1/72527 455/556.1 |
| 2003/0088880 A1* | 5/2003 | Martinez | ............. | H04N 7/17318 725/133 |
| 2004/0098571 A1* | 5/2004 | Falcon | ............. | G06F 1/1626 713/1 |
| 2006/0061963 A1* | 3/2006 | Schrum | ............. | G06F 1/1632 361/679.41 |
| 2008/0138028 A1* | 6/2008 | Grady | ............. | H04N 1/00299 386/291 |
| 2010/0145476 A1* | 6/2010 | Junk | ............. | G05B 19/042 700/7 |
| 2010/0145479 A1* | 6/2010 | Griffiths | ............. | G01D 21/00 700/17 |
| 2010/0250818 A1* | 9/2010 | Gill | ............. | G06F 1/1632 710/304 |
| 2010/0268831 A1* | 10/2010 | Scott | ............. | H04W 64/00 709/228 |
| 2011/0213278 A1* | 9/2011 | Horak | ............. | A61B 5/112 600/595 |
| 2012/0061480 A1* | 3/2012 | Deligiannis | ............. | F24F 11/0012 236/51 |
| 2012/0062370 A1* | 3/2012 | Feldstein | ............. | G06F 1/1626 340/13.22 |
| 2012/0083314 A1* | 4/2012 | Ng | ............. | H04M 1/11 455/557 |
| 2012/0221317 A1* | 8/2012 | Hwang | ............. | H04M 1/24 703/23 |
| 2012/0303190 A1* | 11/2012 | Pfeiffer | ............. | G05D 1/0225 701/22 |
| 2013/0079903 A1* | 3/2013 | Kemmann | ............. | G05B 15/02 700/83 |
| 2013/0086633 A1* | 4/2013 | Schultz | ............. | H04L 9/00 726/2 |
| 2013/0325479 A1* | 12/2013 | Krueger | ............. | G10L 21/00 704/275 |
| 2014/0072312 A1* | 3/2014 | Aldana | ............. | H04B 10/801 398/156 |
| 2014/0122654 A1* | 5/2014 | Jensen | ............. | H04L 67/34 709/219 |
| 2014/0330998 A1* | 11/2014 | Dees | ............. | H04M 1/72527 710/303 |

\* cited by examiner

*Primary Examiner* — Isaac T Tecklu
(74) *Attorney, Agent, or Firm* — Brinks Gilson & Lione

(57) ABSTRACT

A portable terminal may dock to an industrial process controller through a wireless docking interface. The industrial process controller may communicate industrial node (e.g., process sensor) configuration information to the portable terminal. The portable terminal moves within an industrial process environment where processor sensors are located. The portable terminal also docks to the process sensors using the same or different wireless docking interface. Once docked, the portable terminal configures the process sensors with the sensor configuration information.

20 Claims, 5 Drawing Sheets

DOCKING TO SUPPORT SECURE ASSOCIATIONS AND FLEXIBLE MANUFACTURING

PRIORITY CLAIM

This application claims the benefit of priority from U.S. Provisional patent application Ser. No. 61/923,303 filed on Jan. 3, 2014 and from U.S. Provisional patent application Ser. No. 61/885,303 filed on Oct. 1, 2013.

TECHNICAL FIELD

This disclosure relates to configuration of and communication in an industrial environment.

BACKGROUND

Rapid advances in sensors, control systems, and automated machinery have led to the worldwide adoption of industrial manufacturing techniques for every imaginable product. The manufacturing techniques include automation and process control, and operate over an extreme range of temperature, vibration, electrical and acoustic noise, humidity, and other environmental characteristics. Improvements in the configuration and control of industrial environments will help increase the benefits obtained through automated manufacturing.

DETAILED DESCRIPTION

Figure 1:
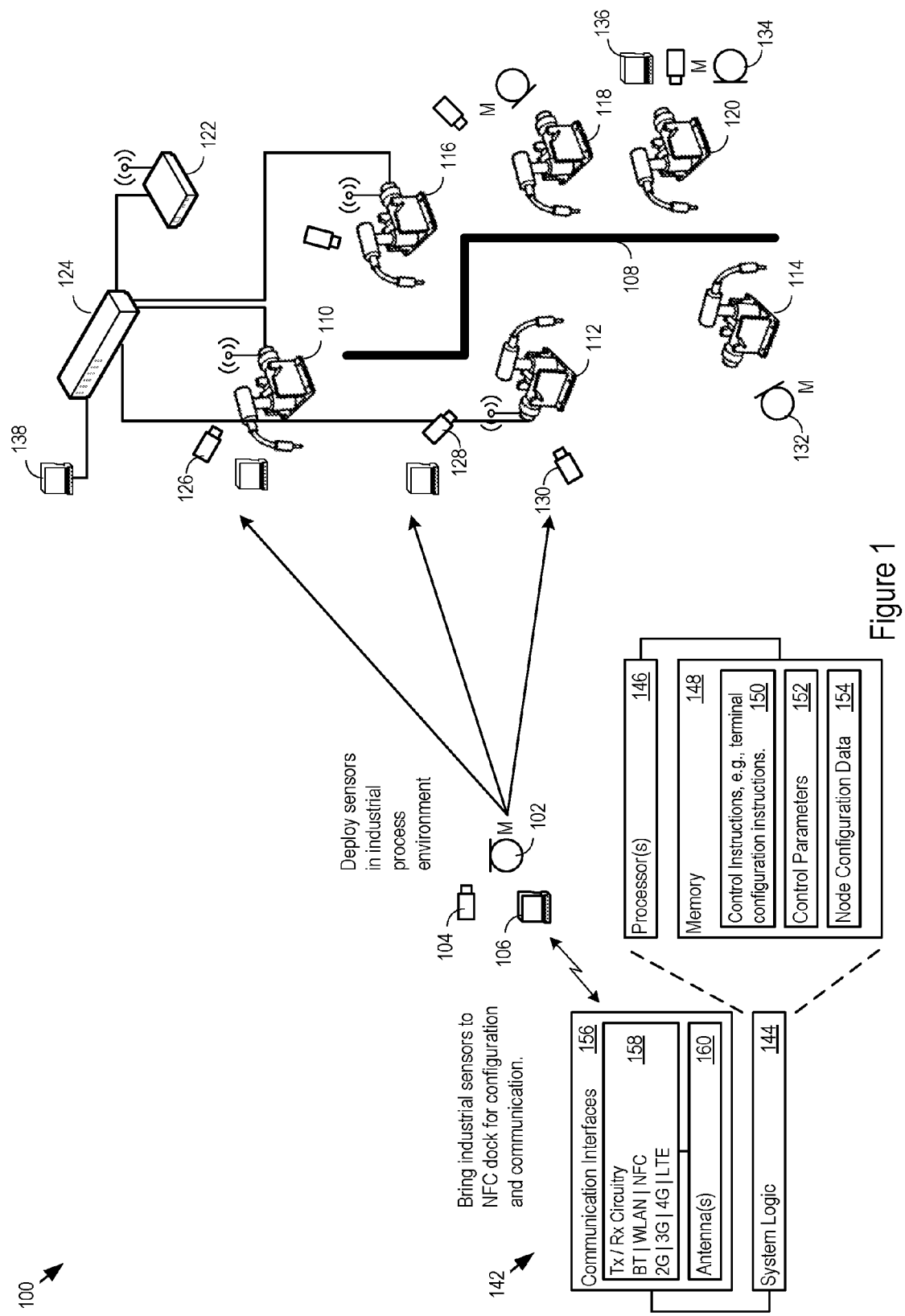
FIG. 1 shows an example of an industrial process environment that uses sensor docking.

FIG. 1 shows an example of an industrial process environment 100 ("environment 100"). The environment 100 uses sensor docking to facilitate configuration, operation, communication, and other operations for the industrial nodes in the environment 100. Examples of industrial nodes include sensors such as microphones (e.g., the microphone 102), cameras (e.g., the camera 104), temperature, energy (e.g., infrared, visible, or Radio Frequency (RF) energy), vibration, moisture, and other types of sensors; controllers (e.g., the process controllers 106, 136, and 138) that, e.g., control, direct, or otherwise manage the operation of industrial nodes; and machines that operate within the environment 100 as part of any predefined industrial process, e.g., welders, pumps, conveyors, presses, injectors, robots, and the like that are setup to manufacture, e.g., an automobile.

The environment 100 may include any number of machines (e.g., the machine 110) arranged, e.g., along a process line 108. The machines may perform any selected operations on materials or objects on the process line 108. The environment 100 in FIG. 1 includes machines 110, 112, 114, 116, 118, and 120, and also shows networking infrastructure that may connect any or all of the industrial nodes, including, e.g., a wireless access point (WAP) 122 and switch 124. The environment 100 also includes multiple sensors, such as the cameras 126, 128, and 130 and the microphones 132 and 134, as well as the process controllers 106, 136 and 138. The industrial nodes may be positioned and configured to monitor and interact with any other industrial nodes of any type. Any type of industrial node may be present in the environment 100, including as examples, network devices such as hubs, switches, routers, or bridges, data servers, actuators, generators, motors, machinery, monitoring devices, computers, management or control systems, environment management devices, analysis systems, communication devices, and any mobile device such as a mobile phone, tablet, and the like. The networking infrastructure may connect together any of the industrial nodes using any combination of wireless and wired networking technologies, e.g., Ethernet, 802.11 a/b/g/n/ac WiFi, proprietary industrial networking, or other technologies.

The machines 110-120 may be implemented as any machinery, robotics, tooling, or other machinery that participate in any operations (e.g., assembly or disassembly) along the process line 108. The machines 110-120 may be communicatively linked to control devices that provide signals to the machines 110-120 to monitor, guide, or control the machines 110-120. In FIG. 1, for instance, the process controller 138 is communicatively linked to the machines 110-120 through the switch 124. In some variations, the process controller 138 is a programmable logic controller (PLC).

The sensors may monitor selected locations in the environment 100. For instance, the sensors may be positioned at predetermined monitoring locations along the process line 108, e.g., proximate to the machines 110-120. The sensors may sense environmental data, such as visual data, audio data, vibration data, temperature data, positional or movement data, or any other environmental data indicative of a characteristic of the environment 100 or the industrial nodes. The industrial nodes may communicate sensed data to any other industrial node in the environment 100.

The environment 100 supports multiple communication links between any of the industrial nodes inside and outside the environment 100. The communication links may provide redundancy or failover capabilities between the communicating industrial nodes. As one such example, the process controller 138 is linked to the machine 110 through both a wired communication path, e.g., via the switch 124 and a wireless communication path, e.g., via the WAP 122. The industrial nodes may in that regard communicate across multiple technologies, including any number of wired technologies and/or wireless technologies.

Any industrial node in the environment 100 may include a communication interface that supports one or more communication links to other industrial nodes inside or outside of the environment 100. A communication interface may be configured to communicate according to one or more communication modes, e.g., according to various communication techniques, standards, protocols, or across various networks or topologies. The communication interfaces may support communication according to particular quality-of-service (QoS) techniques, encoding formats, and any selected physical (PHY) interfaces. For example, a communication interface may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, 4G, Universal Mobile Telecommunications System (UMTS), GSM Association, Long Term Evolution (LTE), or others), WiFi (including 802.11 a/b/g/n/ac), WiMAX, Bluetooth, Near Field Communications (NFC), WiGig (e.g., 802.11ad), and any other wired or wireless technology or protocol.

FIG. 1 also shows a particular example of an industrial node in the form of a programmable logic controller (PLC) 142. The PLC 142 may be implemented in hardware, software, or both. The PLC 142 may be implemented, for example, in a system on a chip (SoC), application specific integrated circuit (ASIC), or other circuitry. In some implementations, the system logic 144 of PLC 142 includes one or more processors 146 and memories 148. The memory 148 stores, for example, control instructions 150 (e.g., program instructions) that the processor 146 executes to carry out any of the adaptation features described below. The memory 148 may also store control parameters 152 and other data 154, such as industrial node configuration data.

The control instructions 150, control parameters 152, and data 154 may facilitate programming, control, and communication with industrial nodes through local docking operations, e.g., NFC docking. In that respect, the communication interface 156 may implement any of the wired or wireless technologies noted above. The antenna(s) 160 facilitate wireless communication operations with the PLC 142.

As will be discussed in more detail below, when an industrial node is docked with the PLC 142, the PLC 142 may configure the industrial node with configuration data (e.g., sensor configuration data), programming instructions (e.g., machine or sensor operating instructions), or other types of data for any industrial node. In addition, the PLC 142 may read any data available from the industrial node, such as sensor measurements, machine operating reports, fault or error conditions, current configuration information, or any other type of data available from the industrial node.

In one implementation, industrial nodes are NFC docked with the PLC 142 by being bought into proximity with the PLC 142. Once docked, the PLC 142 sends to the industrial node any selected programming, configuration, operating instructions, or other configuration data. The PLC 142 may also read any selected information from the industrial node, and either locally analyze that information, or communicate the information to other systems for analysis. Once the industrial node has its configuration information, it can be returned to any specified location in the environment 100 to assume the role for which it has been configured.

Figure 2:
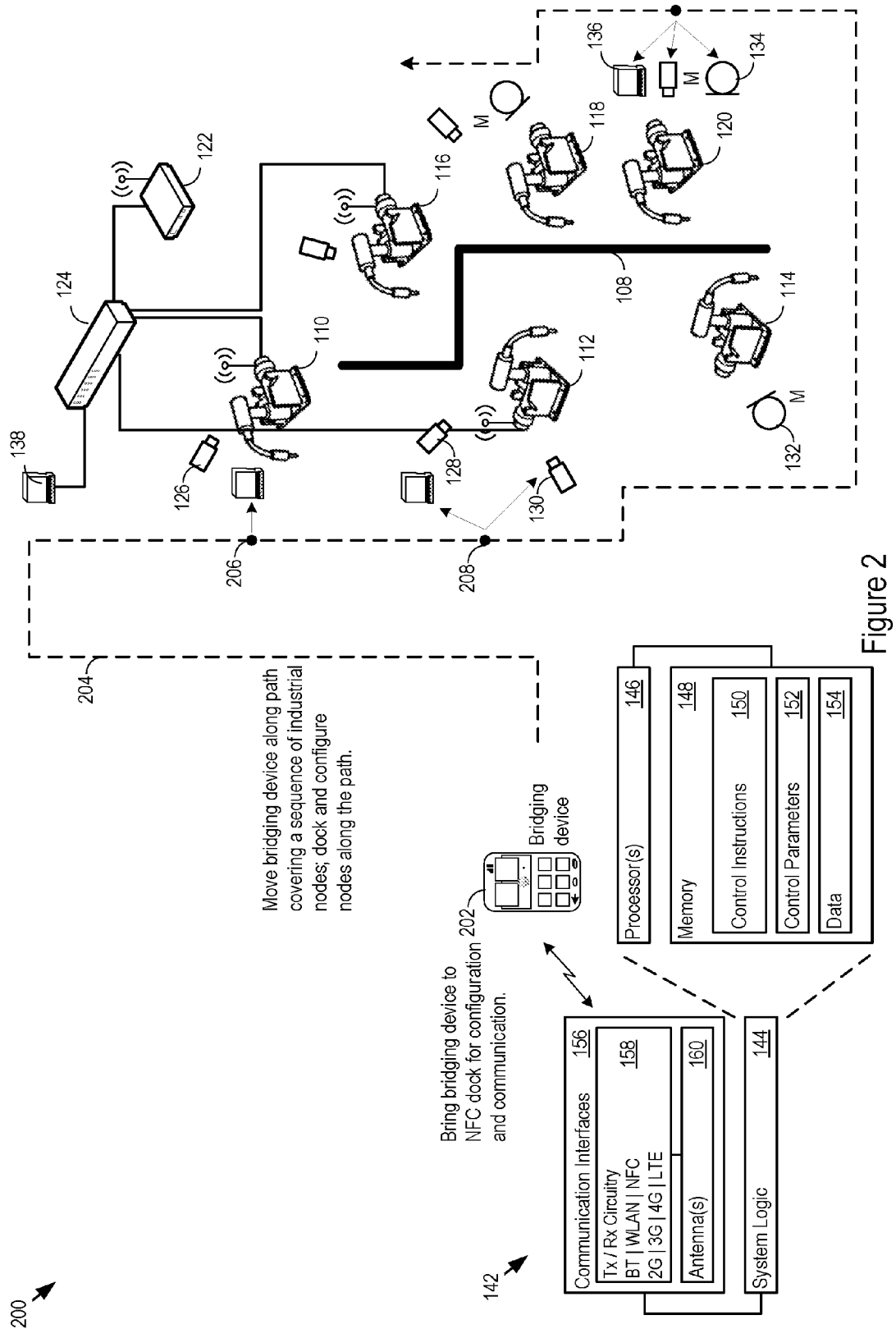
FIG. 2 shows an example of an industrial process environment that uses a bridging device.

FIG. 2 shows an example of an industrial process environment 200 that uses a bridging device ("BD") 202. The BD 202 may be a handheld or portable configuration terminal, as examples. The BD 202 may include any selected wired or wireless communication interfaces for communicating with the PLC 142, including NFC or other wireless docking technologies.

As will also be discussed in more detail below, when the BD 202 is docked with the PLC 142, the PLC 142 may configure the BD 202 with configuration data (e.g., sensor configuration data), programming instructions (e.g., machine operating instructions), or other types of data for any industrial node. Further, the PLC 142 may read any data available from the BD 202, such as sensor measurements, machine operating reports, fault or error conditions, current configuration information, or any other type of data available from the BD 202 that was obtained from industrial nodes, e.g., as the BD 202 moved through the environment 100. Once the BD 202 has the configuration information, it move through the environment 100 to any specified location or sequence of locations to communicate the configuration information to any industrial node. For instance, the BD 202 may NFC dock with any industrial node in the environment 100 may communicate the configuration information for that industrial node to that industrial node. FIG. 2 shows, for instance, a path 204 along which the BD 202 may move, to cover a sequence of industrial nodes along the path. At any path point (e.g., the path points 206 and 208), the BD 202 may dock with any proximate industrial node and configure the industrial node.

Figure 3:
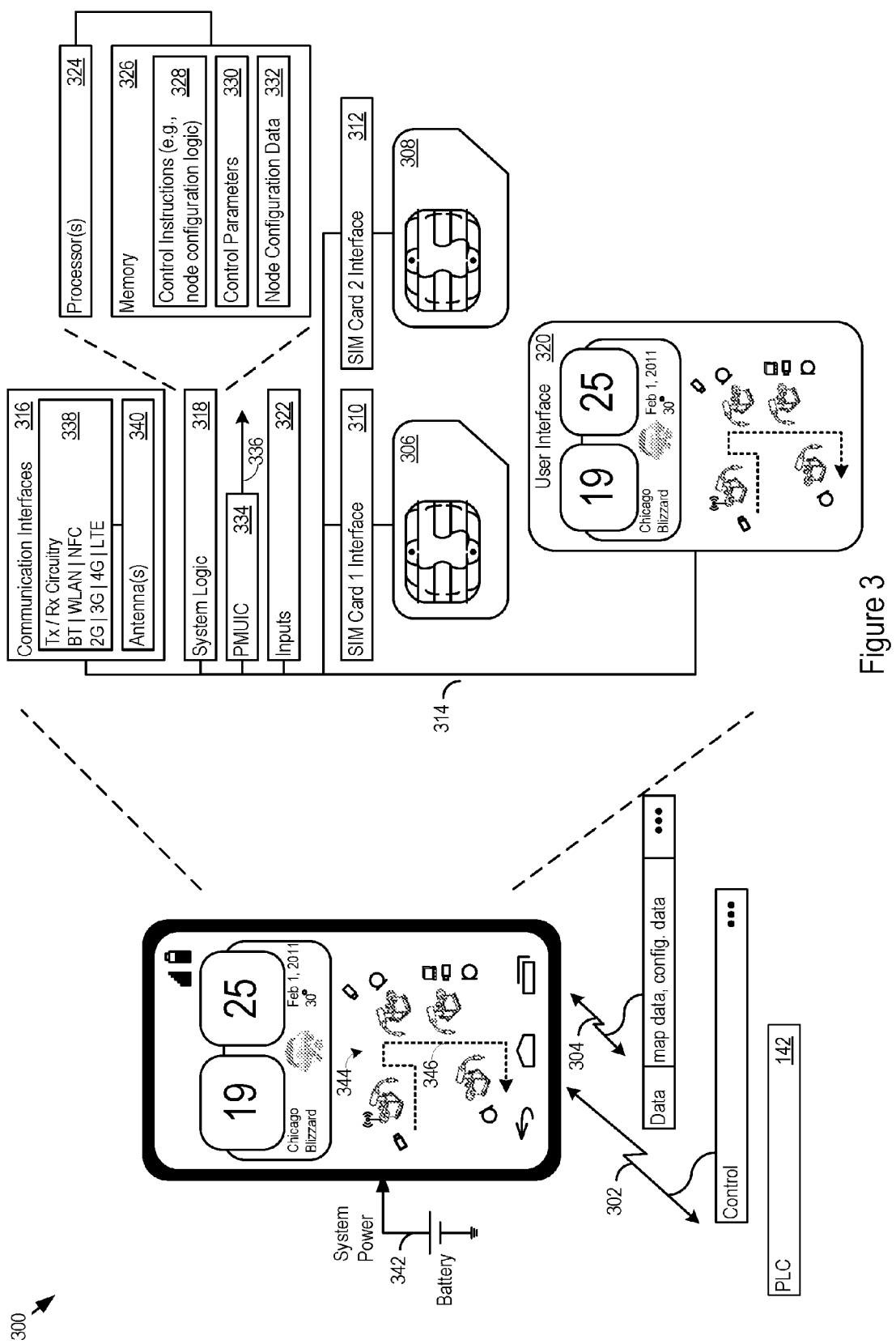
FIG. 3 shows an example of a bridging device.

FIG. 3 shows an example implementation 300 of a BD that may operation as a configuration terminal for industrial nodes in an industrial process environment. The implementation 300 is a smartphone in this example, but a BD may be any portable, handheld or other type of electronic device. The techniques described below regarding docking and industrial node configuration may be implemented in a wide array of different types of BDs. Accordingly, the smartphone example described below provides just one example of a BD.

The implementation 300 may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The implementation 300 may also be a smartphone that, in addition to making and receiving phone calls, runs any number or type of applications. In this example, the implementation 300 supports one or more Subscriber Identity Modules (SIMs), such as the SIM1 306 and the SIM2 308. Electrical and physical interfaces 310 and 312 connect SIM1 306 and SIM2 308 to the rest of the BD hardware, for example, through the system bus 314. A battery or other power supply 342 provides power for the implementation 300.

The implementation 300 includes communication interfaces 316, system logic 318, and a user interface 320. The system logic 318 may include any combination of hardware, software, firmware, or other logic. The system logic 318 may be implemented, for example, with one or more systems on a chip (SoC), application specific integrated circuits (ASIC), discrete analog and digital circuits, and other circuitry. The system logic 318 is part of the implementation of any desired functionality in the implementation 300. In that regard, the system logic 3218 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating NFC connections; establishing, maintaining, and terminating wireless network connections; and displaying relevant information on the user interface 320.

The user interface 320 and the inputs 322 may include a graphical user interface, touch sensitive display, voice or facial recognition inputs, buttons, switches, speakers and other user interface elements. In the example shown in FIG. 3, the GUI 320 displays a map 344. The map 344 may be communicated to the BD 202 by the PLC 142 or other controller, for instance, or may be pre-configured in the BD. The map 344 may visualize the environment 100, and may include location information (e.g., longitude/latitude, XY position on a grid, relative location and distance (e.g., 5 meters to the left of the welder 34-ABC)) for any industrial nodes within the industrial process environment. The map 344 may display a path 346 through the industrial process environment. The path 346 may visualize a recommended manner to physically traverse the environment 100, e.g., to facilitate efficient interaction of the BD with any industrial nodes for programming, configuration, sensor readings, or any other communication task. The path 346 may specify a sequence of multiple process sensors to reconfigure within the industrial process environment with any of the sensor configuration information provided to the BD by the PLC 142.

The BD may have many different types of inputs, some or all of which may communicate with industrial nodes. Examples of the inputs 322 include microphones, video and still image cameras, temperature sensors, vibration sensors, rotation and orientation sensors, headset and microphone input/output jacks, Universal Serial Bus (USB) connectors, memory card slots, radiation sensors (e.g., Infrared sensors), and other types of inputs.

The system logic 318 may include one or more processors 324 and memories 326. The memory 326 stores, for example, control instructions 328 that the processor 324 executes to carry out desired functionality for the BD. The control parameters 330 provide and specify configuration and operating options for the control instructions 328. The memory 326 may also store any data 332 that the BD will send, or has received, through the communication interfaces 316. The BD may include a power management unit integrated circuit (PMUIC) 334. In a complex device like a smartphone, the PMUIC 334 may be responsible for generating as many as thirty (30) different power supply rails 336 for the circuitry in the BD.

In the communication interfaces 316, Radio Frequency (RF) transmit (Tx) and receive (Rx) circuitry 338 handles transmission and reception of signals through one or more antennas 340. The communication interface 316 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 316 may include transceivers that support transmission and reception under the 2G, 3G (e.g., Universal Mobile Telecommunications System (UMTS) or High Speed Packet Access (HSPA)+ operation), BT, WiFi, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

As just one implementation example, the communication interface 316 and system logic 318 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena (™) baseband processor. These devices or other similar system solutions may be extended as described below to provide the additional functionality described below. These integrated circuits, as well as other hardware and software implementation options for the BD, are available from Broadcom Corporation of Irvine, Calif.

Note also that FIG. 3 shows the BD in communication with the PLC 142. The PLC 142 and BD establish communication channels such as the control channel 302 and the data channel 304, and exchange data. The data channel 304 and control channel 302 may be NFC channels, or other types of communication channels.

The NFC interfaces may implement relatively short-range wireless connections, e.g., with an effective range of 10 cm or less. The short range nature of NFC provides security, as does the location restrictions on where the PLC 142 is positioned in conjunction with being within NFC range of that position. The NFC may operate at 13.56 MHz on an ISO/IEC 18000-3 air interface at data rates ranging from 106 kbit/s to 424 kbit/s, as just one example Many other implementations are possible. The NFC initiator may actively generate a RF field to provide power to a communication partner. NFC industrial nodes may therefore take the form of low complexity devices, such as tags, stickers, key fobs, or cards that do not require bulky or permanent power supplies, such as batteries.

Security may be achieved in other manners to differing degrees. For instance, short range communication techniques of types other than NFC communications may similarly facilitate security, e.g., through proximity requirements. Further, either devices or individuals may facilitate secure interactions between any of the entities in the industrial environment, including the industrial nodes, bridging devices, and controllers (e.g., the PLC 142).

Security may include biometrics, such using fingerprints or voice identification as a step in establishing communication between any of the entities. Security may further include exchange of a shared secret, or an exchange of keys (e.g., a public key). The entities may carry out the security steps autonomously or manually.

As another example, security may also be facilitated by Radio Frequency Identification (RFID) tags, including Surface Acoustic Wave (SAW) RFID tags, on or associated with any of the entities. The tags may, for example, return security information upon interrogation by an RFID reader. The RFID reader may also be present or associated with any of the entities.

Figure 4:
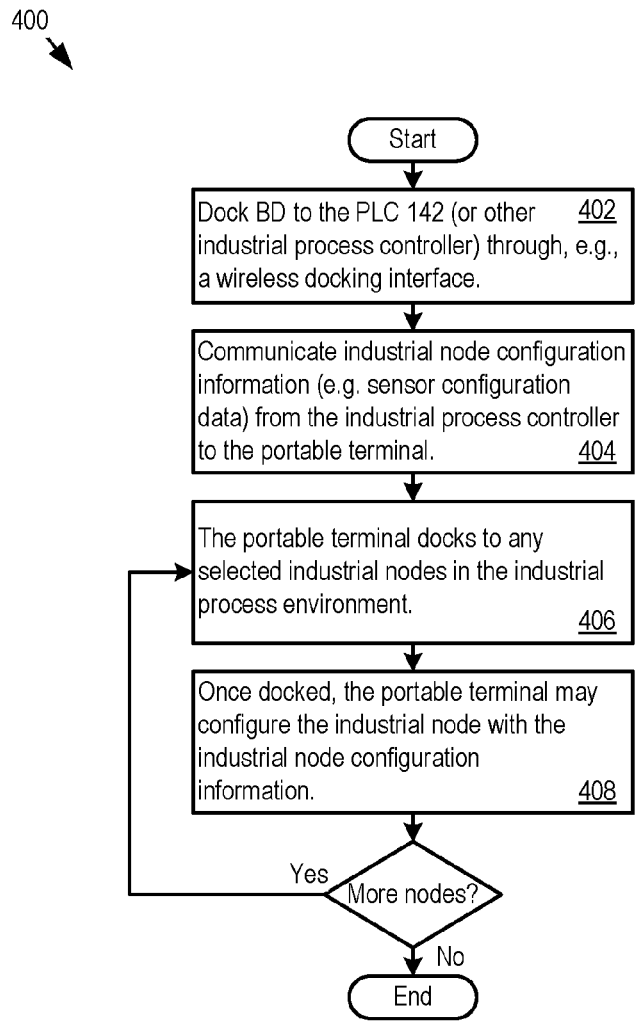
FIG. 4 shows control instructions, e.g., for a bridging device.

Several example aspects of the docking technology are described next. Many other variations are possible. In one aspect, a portable configuration terminal (e.g., the BD 202) may include terminal configuration logic and sensor configuration logic implemented, e.g., as a processor that executes program instructions. The terminal configuration logic may be configured to dock the portable configuration terminal through a controller docking interface to a controller device, and obtain sensor configuration information for any number of process sensors from the controller device while docked with the controller device. FIG. 4 shows logic 400, e.g., for the BD 202 that may be implemented in program instructions for the terminal configuration logic and sensor configuration logic. The portable configuration terminal may be docked to a controller device such as the PLC 142 or other industrial process controller through, e.g., a wireless docking interface (402). The industrial process controller may then communicate industrial node configuration information (e.g. sensor configuration data) from the industrial process controller to the portable terminal (404). As the portable terminal moves through the industrial process environment, the portable terminal may dock to any selected industrial nodes in the industrial process environment (406). Once docked, the portable terminal may configure the industrial node with the industrial node configuration information (408).

Docking to the industrial process controller may include docking with a first wireless communication technology supported by the industrial process controller, and docking to the industrial node may include docking with a second wireless communication technology supported by the industrial node that is different than the first wireless communication technology. For instance, docking may include NFC docking, Bluetooth docking, or another type of docking.

The industrial node configuration information may vary widely. As one example, the industrial node configuration information may include operating instructions for the industrial node. As another example, the industrial node configuration information may include operational settings for the industrial node. The industrial node may be in place in the industrial process environment to support a current manufacturing process; and the industrial node configuration information may include operating instructions that modify the industrial node to support a new manufacturing process different than the current manufacturing process.

As another example, the docking technology may be part of a manufacturing system. The system may include a manufacturing process line in an industrial process environment and multiple process sensors or other types of industrial nodes arranged in relation to the manufacturing process line to support a current manufacturing process. The industrial nodes may include docking interfaces.

A configuration terminal (e.g., the BD 202) may be provided that is capable of moving in the industrial process environment, e.g., the configuration terminal may be portable. The configuration terminal may include a terminal docking interface for docking with the docking interfaces and a memory operable to store configuration information for the industrial nodes. The memory may also store configuration logic operable to dock the configuration terminal to the docking interfaces and reconfigure the industrial nodes with the configuration information while docked with the docking interfaces. Again, the configuration information may include operating instructions for the industrial nodes, operational setting for the industrial nodes, or other types of configuration information. The configuration information may include operating instructions that modify the industrial nodes to support a new manufacturing process different than the current manufacturing process.

The memory may also store a map of the industrial process environment and the terminal may include an output operable to display the map. The map may include location information for the industrial nodes within the industrial process environment. The map may specify a sequence of the multiple industrial nodes to reconfigure with the configuration information.

Figure 5:
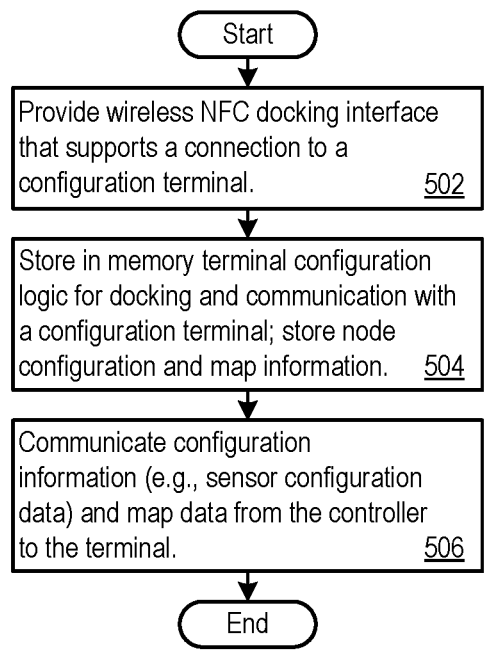
FIG. 5 shows control instructions, e.g., for a controller.

In another aspect, as described in conjunction with FIG. 5 which shows control instructions 500, e.g., for a controller device (e.g., the PLC 142), the controller device may include a wireless NFC docking interface that supports a connection to a portable configuration terminal (502). The controller device may also include a memory in communication with the docking interface. The memory may store configuration information for industrial nodes (e.g., sensor configuration information for industrial sensors) that support a current manufacturing process in an industrial process environment. The memory in the controller device may also store map data that includes location information for the industrial nodes within the industrial process environment. The memory may also store terminal configuration logic operable to dock the controller device to a configuration terminal (e.g., the BD 202) through the NFC docking interface (504).

In that respect, the controller device may connect to a controller docking interface in the configuration terminal. The controller docking interface may be any of the interface types noted above, including, as just one example, a secure NFC docking interface. The configuration logic is operable to transfer to the configuration terminal the sensor configuration information, the map data, the sensor configuration instructions for the process sensors, and any other desired configuration information for the configuration terminal or the process sensors, while docked through the NFC docking interface (506).

In some implementations, the BD 202 may communicate with industrial nodes through the sensing interface provided by the industrial node. For instance, when the industrial node is a vibration sensor, the BD 202 may communicate with the vibration sensor by vibrating on or near the vibration sensor, with the vibrations representing an encoding of the data for detection by the vibration sensor. As another example, the BD 202 may communicate with an infrared sensor using infrared wavelengths, or with a visible light sensor using visible light that encodes data.

The types of industrial nodes that may dock (e.g, with the PLC 142) range from individual discrete sensors, such as temperature sensors, to entire sensor assemblies of multiple sensors, to entire pieces of machinery. The machinery may include robots or other sophisticated devices.

In other implementations, the BD 202 may not only program or configure the industrial nodes, the BD 202 may become part of the network of industrial nodes. For instance, once moved into the industrial environment, the BD 202 may be positioned anywhere desired and execute any control instructions according to any configuration information provided, e.g., by the PLC 142. Thus, the BD 202 may control all or part of the industrial nodes in the industrial environment.

The methods, devices, instructions and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store program instructions that perform any of the system processing described above.

What is claimed is:

1. A method comprising:
docking a portable terminal to an industrial process controller through a docking interface using a first communication technology supported by the process controller;
communicating sensor configuration information from the industrial process controller to the portable terminal;
moving the portable terminal into an industrial process environment;
docking the portable terminal to a process sensor in the industrial process environment using a second communication technology supported by the process sensor, the second communication technology different from the first; and
configuring the process sensor with the sensor configuration information.

2. The method of claim 1, where docking to the industrial process controller comprises:
near field communication (NFC) docking.

3. The method of claim 1, where docking to the industrial process controller comprises:
Bluetooth docking.

4. The method of claim 1, where the sensor configuration information comprises operating instructions for the process sensor.

5. The method of claim 1, where the sensor configuration information comprises operational settings for the process sensor.

6. The method of claim 1, where:
the process sensor is in place in the industrial process environment to support a current manufacturing process; and where:
the sensor configuration information comprises operating instructions that modify the process sensor to support a new manufacturing process different than the current manufacturing process.

7. The method of claim 1, further comprising:
communicating a map of the industrial process environment from the industrial process controller to the portable terminal.

8. The method of claim 7, where the map comprises:
location information for the process sensor within the industrial process environment.

9. The method of claim 7, where:
the process sensor is included among a sequence of multiple process sensors; and
the map comprises:
location information for the sequence of multiple process sensors to reconfigure within the industrial process environment with the sensor configuration information.

10. A portable configuration terminal comprising:
a terminal docking interface configured to dock, using a first communication technology, with a sensor docking interface of a process sensor in an industrial process environment;

a controller docking interface configured to dock using a second communication technology, with a controller device, the second communication technology different from the first;
terminal configuration circuitry operable to:
dock the portable configuration terminal through the controller docking interface to the controller device; and
obtain sensor configuration information for the process sensor from the controller device while docked with the controller device;
a memory operable to store the sensor configuration information for the process sensor; and
sensor configuration circuitry operable to:
dock the portable configuration terminal through the sensor docking interface to the process sensor; and
reconfigure the process sensor with the sensor configuration information while docked with the sensor docking interface.

11. The portable configuration terminal of claim 10, where:
the sensor configuration information comprises operating instructions for the process sensor.

12. The portable configuration terminal of claim 10, where the sensor configuration information comprises operational settings for the process sensor.

13. The portable configuration terminal of claim 10, where:
the sensor configuration information comprises operating instructions that modify the process sensor to support a new manufacturing process that is different than a current manufacturing process supported by the process sensor.

14. The portable configuration terminal of claim 10, where the memory is further operable to store:
a map of the industrial process environment; and further comprising:
an output operable to display the map.

15. The portable configuration terminal of claim 14, where the map comprises:
location information for the process sensor within the industrial process environment.

16. The portable configuration terminal of claim 14, where:
the map specifies a sequence in which multiple process sensors reconfigure.

17. A controller device comprising:
a docking interface configured to connect to a portable configuration terminal configured to dock with a process sensor using a first communication technology;
a memory in communication with the docking interface, the memory comprising:
sensor configuration information for the process sensor that support a current manufacturing process in an industrial process environment;
a sensor configuration instruction for the process sensor;
map data comprising location information for the process sensor within the industrial process environment; and
portable terminal configuration logic operable to:
dock the controller device to a configuration terminal through the docking interface using a second communication technology supported by the controller device, the second communication technology different from the first; and transfer to the configuration terminal the sensor configuration information, the map data, and the sensor configuration instruction for the process sensor, while docked through the docking interface.

18. The controller device of claim 17, where:
the sensor configuration information comprises an operating instruction for the process sensor that reconfigures the process sensor to support a new manufacturing process in the industrial process environment.

19. The controller device of claim 18, where the map data specifies a sequence in which multiple process sensors reconfigure with using sensor configuration information to support the new manufacturing process in the industrial process environment.

20. The controller device of claim 19, where the map data further specifies a recommended path for traversing the industrial processing environment to execute the sequence.

* * * * *